(12) United States Patent
Ishikawa et al.

(10) Patent No.: US 7,010,504 B2
(45) Date of Patent: Mar. 7, 2006

(54) COMPETITIVE BUYING AND SELLING SYSTEM AND ITS CONTROL METHOD

(75) Inventors: Akio Ishikawa, Tokyo (JP); Satoshi Konishi, Saitama (JP); Hajime Nakamura, Saitama (JP)

(73) Assignee: DDI Corporation, Tokyo (JP)

( * ) Notice: Subject to any disclaimer, the term of this patent is extended or adjusted under 35 U.S.C. 154(b) by 762 days.

(21) Appl. No.: 09/817,033

(22) Filed: Mar. 27, 2001

(65) Prior Publication Data

US 2001/0029480 A1 Oct. 11, 2001

(30) Foreign Application Priority Data

Mar. 30, 2000 (JP) ............................. 2000-093539
Sep. 28, 2000 (JP) ............................. 2000-296063

(51) Int. Cl.
*G06F 17/60* (2006.01)

(52) U.S. Cl. ......................................... 705/26; 705/37

(58) Field of Classification Search ................. 708/26, 708/87; 705/26, 27, 37

See application file for complete search history.

(56) References Cited

U.S. PATENT DOCUMENTS

| 5,835,896 | A  | * | 11/1998 | Fisher et al. .................. 705/37 |
| 6,161,099 | A  | * | 12/2000 | Harrington et al. ........... 705/37 |
| 6,415,270 | B1 | * | 7/2002  | Rackson et al. ............... 705/37 |
| 2002/0002526 | A1 | * | 1/2002 | Kotas ........................... 705/37 |

FOREIGN PATENT DOCUMENTS

JP 2002-163488 * 7/2002

OTHER PUBLICATIONS

No Author, "Bid.com Launches Personalized Marketing Service For Its Customers; Use of Net Perceptions Real-time Recommendation Engine a First for Online Auctions", Business Wire, Nov. 5, 1998. Retreived from ProQuest Jun. 10, 2005.*

* cited by examiner

*Primary Examiner*—John G. Weiss
*Assistant Examiner*—Naeem Haq
(74) *Attorney, Agent, or Firm*—Westerman, Hattori, Daniels & Adrian, LLP

(57) ABSTRACT

There is proposed a competitive buying and selling system that avoids unnatural bidding prices and exclusive possession of resources, stabilizes bidding prices, and provides such an environment that participants can bid easily. There are included a first step in which a server opens a subject of buying and selling and a successful bid evaluation function thereof to a plurality of clients, a second step in which each of the clients makes a participant determine the subject of buying and selling and a bidding price thereof by using the successful bid evaluation function, and notifies a determined result to the server, and a third step in which the server selects a bidding price of a participant who has indicated a highest evaluation value based on the successful bid evaluation function among all bidding prices notified from the clients and designates the participant as a successful bidder. The successful bid evaluation function is based on past bidding prices per unit volume and utilization efficiencies of resources knocked down in past. Furthermore, the successful bid evaluation function is based further on a resource occupation rate in bidding of this time.

8 Claims, 2 Drawing Sheets

COMPETITIVE BUYING AND SELLING SYSTEM AND ITS CONTROL METHOD

BACKGROUND OF THE INVENTION

1. Field of the Invention

The present invention relates to such a competitive buying and selling system that it is difficult to make a successful bid with an improper bidding price and a bidding subject cannot be knocked down exclusively, its control method, and recording media having its control programs recorded thereon.

2. Description of the Related Art

In a conventional competitive buying and selling system, an upper limit value or a lower limit value is determined in a bidding price in order to avoid an unnatural bidding price or exclusive possession of resources. In the case where an upper limit value or a lower limit value is opened to bidding participants, however, there is a possibility that bidding prices will concentrate to an upper limit value or a lower limit values and a successful bidder cannot be specified. Usually, the upper limit value or lower limit value of the bidding price is not opened to bidding participants in order to avoid such a situation. Therefore, participants need to presume the upper limit or lower limit value, and it becomes difficult for a participant having no know-how to make a successful bid.

Essentially, the price should be formed through fair and free competitions of participants. In the case where exclusive possession of resources by some bad participants and a resultant shutout of other participants are conducted, however, the fair and free environment may be lost. Furthermore, a bad participant who intends to exclusively possess resources attempts to shut out other participants by offering an unnatural bidding price. Therefore, the contract price may become unstable. In addition, a bidding subject maybe knocked down exclusively to some wicked, amply funded participant, and other participants may be shut out.

SUMMARY OF THE INVENTION

In accordance with a first aspect of the present invention, there is provided a competitive buying and selling system of the first embodiment, its control method, and recording media having its control programs recorded thereon, that avoid unnatural bidding prices and exclusive possession of resources, stabilize successful bid prices, and provide such an environment that the participants can easily bid.

A competitive buying and selling system according to the first aspect of the present invention includes a first step in which a server opens a subject of buying and selling and a successful bid evaluation function thereof to a plurality of clients; a second step in which each of the clients makes a participant determine the subject of buying and selling and a bidding price thereof by using the successful bid evaluation function, and notifies a determined result to the server; and a third step in which the server selects a bidding price of a participant who has indicated a highest evaluation value based on the successful bid evaluation function among all bidding prices notified from the clients and designates the participant as a successful bidder.

The seller can determine the successful bid evaluation function by taking various conditions into consideration. Therefore, it is not necessary to determine a successful bidder by a bidding price only. Furthermore, such an effect as to further improve the profit of the seller can be anticipated from aspects other than the bidding price. Furthermore, since the successful bid evaluation function is opened to the public, each participant can calculate the evaluation value and determine the bidding price and so on so as to obtain a higher evaluation value. To be concrete, in the present invention, the function can be set so as to provide excellent participants with advantages in bidding and exclude bad participants who anticipate unnatural bidding prices and exclusive possession of resources.

It is also preferably that the successful bid evaluation function is based on past bidding prices per unit volume and utilization efficiencies of resources knocked down in the past. The successful bid evaluation function may be a function of multiplying the past bidding prices per unit volume by the utilization efficiencies of resources knocked down in the past. As a result, it also becomes possible to implement such a situation that a person who attempts to participate in the bidding of this time with a price that is extremely different from past bidding prices or a person who attempts to participate in the bidding of this time although the person does not fully utilize resources knocked down in the past, and so on, cannot make a successful bid unless the person bids a higher price.

As an example of the former cited case, there is person who bid low prices in the past, but attempts to bid a high price in the bidding of this time for the purpose of exclusively possess resources. As an example of the latter cited case, there is person who made successful bids for some communication resources in the past, but who has not utilized the band sufficiently.

It is also preferably that the successful bid evaluation function is based on a resource occupation rate in bidding of this time. As a result, it also becomes possible to implement such a situation that a person who aims at exclusively possessing resources cannot make a successful bid unless the person bids a higher price. The successful bid evaluation function may be a function of dividing a product value obtained by the above described multiplying by the resource occupation rate in bidding of this time.

The first aspect of the present invention can be applied to both a simultaneous bidding method and a competitive bidding method.

In the competitive buying and selling system according to the first aspect of the present invention, the server includes first means for opening a subject of buying and selling and a successful bid evaluation function thereof to a plurality of clients; and third means for selecting a bidding price of a participant who has indicated a highest evaluation value based on the successful bid evaluation function among all bidding prices notified from the clients and designates the participant as a successful bidder. Each of the clients includes second means for making a participant determine the subject of buying and selling and a bidding price thereof by using the successful bid evaluation function, and notifies a determined result to the server.

Recording media having control programs of the competitive buying and selling system according to the first aspect of the present invention recorded thereon include a server side program and client side programs. The server side program includes a first control program for opening a subject of buying and selling and a successful bid evaluation function thereof to a plurality of clients; and a third control program for selecting a bidding price of a participant who has indicated a highest evaluation value based on the successful bid evaluation function among all bidding prices notified from the clients and designates the participant as a successful bidder. Each of the client side programs includes a second control program for making a participant determine the subject of buying and selling and a bidding price thereof by using the successful bid evaluation function, and notifies a determined result to the server.

In accordance with a second aspect of the present invention, there is provided a competitive buying and selling system that prevents a subject of bidding from being knocked down exclusively, its control method, and recording media having its control programs recorded thereon.

A control method of a competitive buying and selling system according to the second aspect of the present invention includes a first step in which a server sets a bidding flag assigned to each participant; a second step in which the server opens a part of a subject of buying and selling to a plurality of clients; a third step in which each of the clients makes a participant determine a part of the subject of buying and selling and a bidding price thereof, and notifies a determined result to the server; a fourth step in which the server designates a person who has indicated a highest or lowest bidding price among participants each being set the bidding flag, as a successful bidder; and a fifth step in which the server resets the bidding flag of the participant who has made a successful bid. The second step to the fifth step are repeated. As a result, it is prevented the subject of bidding is knocked down exclusively.

In the fifth step, preferably, if the participant who has made a successful bid has made a successful bid for at least a predetermined occupation rate of the bidding subject, the bidding flag of the participant who has made a successful bid is reset. If the participant who has made a successful bid has made a successful bid for the bidding subject at least a predetermined number of times, the bidding flag of the participant who has made a successful bid may be reset in the fifth step.

In a competitive buying and selling system according to the second aspect of the present invention, the server includes means for setting a bidding flag assigned to each participant, before bidding; means for opening a part of a subject of buying and selling to a plurality of clients; means for designating a person who has indicated a highest or lowest bidding price among participants each being set the bidding flag, as a successful bidder; and means for resetting the bidding flag of the participant who has made a successful bid. Each of the clients includes means for making a participant determine a part of the subject of buying and selling and a bidding price thereof, and notifying a determined result to the server.

Recording media having programs of the competitive buying and selling system recorded thereon includes a server side program and client side programs. The server side program includes a control program for setting a bidding flag assigned to each participant, before bidding; a control program for opening a part of the subject of buying and selling to a plurality of clients; and a control program for designating a person who has indicated a highest or lowest bidding price among participants each being set the bidding flag, as a successful bidder; and a control program for resetting the bidding flag of the participant who has made a successful bid. Each of the client side programs includes a control program for making a participant determine a part of the subject of buying and selling and a bidding price thereof, and notifying a determined result to the server.

DETAILED DESCRIPTION OF THE PREFERRED EMBODIMENTS

Figure 1:
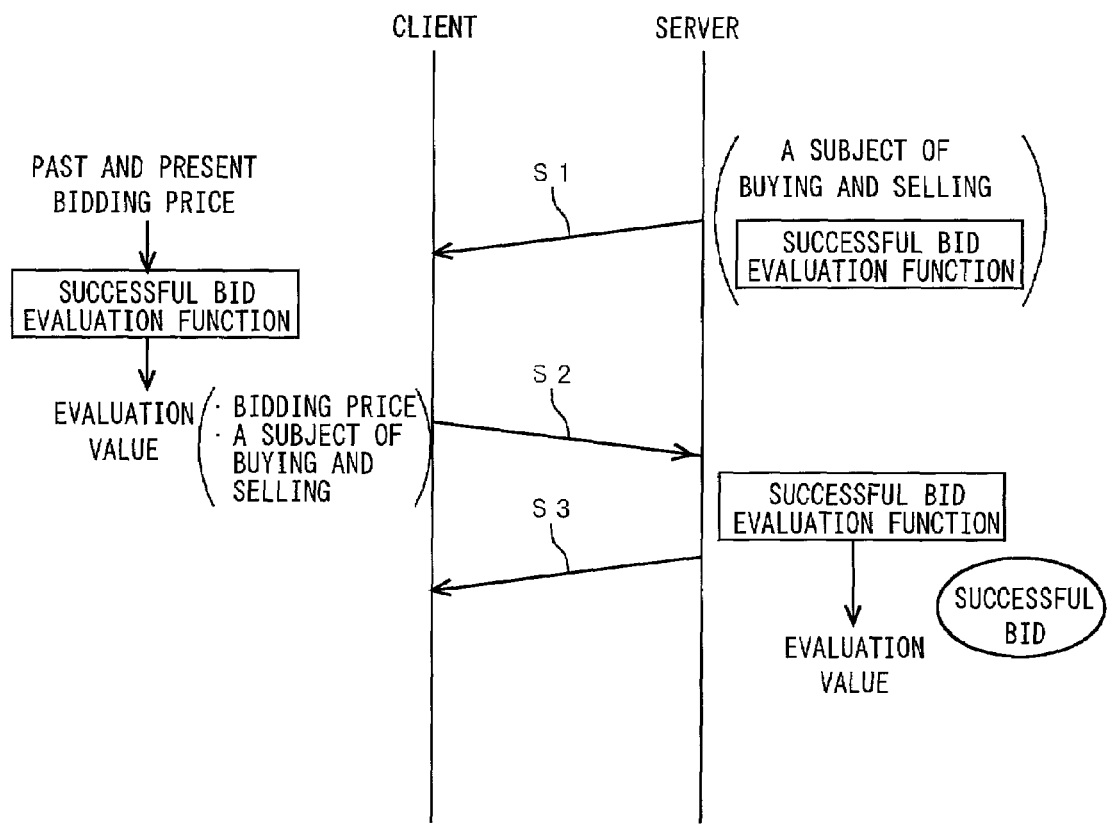
FIG. 1 is a control sequence diagram of a competitive buying and selling system of a first embodiment according to the present invention.

First, terms will now be defined. A term "bidding" refers to such a system that one of bidding participants who has made a bid with the highest or lowest price within a range of a probable price preset by an orderer is designated as the other party of a contract and the contract price is set to that bidding price. As bidding methods, there are "simultaneous bidding" and "competitive bidding". In the "simultaneous bidding", bidding participants cannot refer to bidding prices of other bidding participants, and bids are opened after each bidding participant has made a bid only once. In the "competitive bidding", each bidding participant is allowed to refer to bidding prices of other bidding participants and successively alter the own bidding price. The present invention can be applied to both bidding methods.

A term "orderer" refers to one subject who presents a subject of bidding and collects bidding participants. The orderer sets a probable price, sells a bidding subject to a bidding participant who has offered the highest or lowest bidding price in the range of the probable price, and makes a profit. The higher or lower the selling price becomes, the more profit the orderer makes.

A term "bidding participants" (hereafter referred to as "participants") refers to a plurality of subjects who bid for the purpose of a successful bid of a resource of a bidding subject presented by the orderer. It is assumed that the participants neither exchange information concerning the bidding price, nor collect and provide information of an business organization having those participants as members, nor promote exchange of information among those participants.

A term "bidding subject" refers to a goods or service presented by the orderer for which the participants bid for the purpose of making a successful bid of the goods or service. The following two cases are conceivable.

(1) A single indivisible goods or service: Its successful bidder is only one person who has offered a highest bidding price. For example, it is a picture, a curio, or the like.

(2) A goods or service having a resource that can be divided to a plurality of participants: There may be a plurality of successful bidders who have offered high bidding prices. It is assumed that the orderer attempts to avoid such a state that one specific participant exclusively possesses resources of a bidding subject and aims at such a state that the resources can be distributed to as many participants as possible. This is because an increase in the number of participants and a profit increase can be anticipated for the long run, if the number of successful bidders is increased. As an example, the band of the network can be mentioned.

A term "excellent participants" refers to participants who bid rational prices in every bidding. In the case where the bidding subject has a resource that can be distributed to a plurality of participants, the excellent participants bid for a part of the resource.

A term "new participants" refers to participants who have not participated in past bidding.

A term "bad participants" refers to participants who bid irrationally high prices judging from actual results of past bidding. In the case where the bidding subject has a resource that can be divided to a plurality of participants, the term "bad participants" refers to participants who attempt to exclusively obtains the resource.

A term "actual result weight evaluation function," i.e., "successful bid evaluation function" refers to a function for calculating an evaluation value given to each participant by the orderer for a content of a bid made this time by the participant, with regard to past bidding contents and situations of use of resources knocked down, as described later in detail. This evaluation value is set by the orderer and presented previously to participants.

FIG. 1 is a control sequence diagram of a competitive buying and selling system according to the present invention. The control sequence is formed of processing of the following three steps.

(1) A server opens a buying and selling subject and its successful bid evaluation function to a plurality of clients.

(2) Each client makes a participant determine a buying and selling subject and its bidding price, and notifies them to the server.

(3) From among all bidding prices notified by the clients, the server selects a bidding price of a participant who has indicated a highest value based on the successful bid evaluation function.

The successful bid evaluation function, i.e., the actual result weight evaluation function will now be described. By learning from the past bidding results of each participant and situations of use of resources knocked down, the function estimates the probable bidding price of the participant of this time. As a reference of estimation, the orderer sets the actual result weight evaluation function, and previously opens it to the participants.

As for parameters, the following parameters are used.

n: A bidding time. Bidding of an immediately preceding time is considered to be bidding of one time before (n=1), and bidding of this time is considered to be bidding of 0 time before (n=0).

Bn: Bidding price in bidding of n times before.

Wn: Amount of resources of a bidding subject in bidding of n times before.

Rn: Use efficiency of a resource knocked down in bidding of n times before ($0.0 \leq Rn \leq 1.0$). In the case where a successful bid cannot be made, Rn is set equal to Rn=0.0.

N: The number of times of past bidding participation. If the number of times of bidding participation is too large, then the number of times is limited to the range from bidding of N times before to bidding of this time, and attention is paid to only the range. Bidding made before (N+1) times before may be disregarded.

M: A resource occupation rate in bidding of this time. If the bidding subject is a single indivisible goods or service, then M is set equal to M=1.0.

E: An evaluation value for each participant.

Embodiments of the successful bid evaluation function will now be described. In any case, it is possible to determine an upper limit value of the bidding price and exclude a bidding price that is at least the upper limit value as being outside of the range without calculating an evaluation value.

As an example of the simplest successful bid evaluation function, there is the following expression.

$$E = \frac{\sum_{n=0}^{N} \frac{B_n}{W_n}(1+R_n)}{M(N+1)} \quad \text{[formula 1]}$$

This successful bid evaluation function multiplies a past (including this time) bidding price per unit volume (Bn/Wn) by a utilization efficiency of resources knocked down in the past (1+Rn), derives an evaluation value of past bidding per time, and divides the evaluation value by the resource occupation rate (M) in bidding of this time. Even if a participant who bid only low prices in the past bids a high price this time with the intention of shutting out other participants, the evaluation value does not become high. Even if the participant sets a further higher bidding price in order to make the evaluation value higher, the bidding price is excluded because there is the upper limit value of bidding price. Furthermore, at time when the participant makes a successful bid, double addition is conducted corresponding to the use rate of a resource knocked down. As the ratio of successful bids in the past becomes higher, the evaluation value becomes high.

Furthermore, in the case where this successful bid evaluation function is used, a by-bidder aiming at raising the bidding price stands at a disadvantage because the number of times of past successful bid is few. This benefits the participants from the viewpoint of preventing the bidding price from being raised unnecessarily.

For turning to a new participant's advantage, R0 in the above described expression can be made R0=0. This is an evaluation function obtained by improving the evaluation function so as to turn to new participants. This brings about an effect of increasing participants, and benefits the orderer for the long run.

As an example of a successful bid evaluation function having a tendency to maintain the price, there is the following expression.

$$E = \frac{\frac{B_0}{W_0}(1+R') + \sum_{n=1}^{N}\frac{B_n}{W_n}(1+R_n)}{M(N+1)}$$ [formula 2]

$$\left( R' = \frac{\frac{B_1}{W_1}}{\sum_{n=2}^{N}\frac{B_n}{W_n}(1+R_n)}, R' \leq 1.0 \right)$$

The higher price a participant bid in the past, the more remarkably an evaluation value falls at the next time in the successful bid evaluation function once the bidding price is lowered. Bidders of high prices have a tendency to continue bidding of high prices in bidding of the next time and subsequent bids as well in order to maintain the evaluation value. This results in a profit increase of the orderer.

Determination of a successful bidder will now be described. The orderer opens bids in the presence of participants on the Internet. After bid opening, bidding prices of the participants are opened to the public, and reflected to the successful bid evaluation function of bidding of the next time. The bidding price of each participant is inputted to the successful bid evaluation function, and an evaluation value is derived.

In the case of simultaneous bidding, the orderer designates a participant having the highest evaluation value as the other party of the contract, and a bidding price of the designated participant is set to the contract price.

In the case of competitive bidding, the orderer presents a highest evaluation value at that time point. In addition, each participant also must calculate an evaluation value from the own bidding price, and determine a bidding price so as to exceed the highest evaluation value at that time point, or drop out of the bidding.

Each participant can verify the accounts of the evaluation value used by the orderer on the basis of the prices opened to the public, and judge whether there is a problem in the result of a successful bid.

An embodiment of the above described competitive buying and selling system will now be described. It is now assumed that the subject of buying and selling is bands of a network, and the orderer is a communication industrial company having the network. It is further assumed that the participants aim at purchasing the network and utilizing the network for service provision. If all bands of the network of the bidding subject are knocked down to one participant, then it becomes possible for only that participant to provide service and the participant obtains the profit exclusively. In this way, a bad participant presents an unnaturally high bidding price for the purpose of making a successful bid for all bands. According to the present invention, the communication industrial company sets a successful bid evaluation function and opens it to participants. Each participant can examine an evaluation value obtained by giving a bidding price to the successful bid evaluation function. After the bid opening, the communication industrial company calculates an evaluation value of each participant on the basis of the bidding price of this time, past bidding prices, and use situations of bands knocked down of the participant. The orderer designates a participant having a highest evaluation value as a successful bidder, and contracts with the participant.

In the above described various embodiments of the present invention, those skilled in the art can easily conduct various changes, modifications, and omissions falling in the range of the technical spirit and scope of the present invention. The foregoing description is nothing but an example, and it does not impose any restrictions. The present invention is restricted by only claims and their equivalents.

According to the competitive buying and selling system of the first embodiment, its control method, and recording media having its control programs recorded thereon, it becomes possible to avoid unnatural bidding prices and exclusive possession of resources, stabilize successful bid prices, and provide such an environment that the participants can easily bid, by correcting the bidding price of this time with due regard to the history of past bidding prices of respective bidding participants.

As for advantages of the seller, such a situation that excellent participants gain an advantage over bad participants in making a successful bid can be implemented by setting the appropriate successful bid evaluation function. As a result, it becomes possible to exclude bad participants who bid unnaturally high prices and avoid exclusive possession of resources by specific participants. Furthermore, in order to gain advantage in future successful bids even if it is slight, each participant sets a high bidding price habitually. As a result, the profit of the seller is increased.

On the other hand, as for the advantages of the participants, bad participants are excluded and it becomes hard to bid an unnaturally high price. As a result, the bidding price is stabilized and it becomes possible to prepare such an environment that participants can easily bid.

A second embodiment of the present invention will now be described. The bidding subject of the present embodiment is goods or service having a resource that can be distributed to a plurality of participants. As successful bidders, there may be a plurality of bidders offering highest bidding prices. It is now assumed that the orderer attempts to avoid such a state that one specific participant exclusively possess the resource of the bidding subject and implement such a state that the resource is distributed to as many participants as possible. The reason is that an increase in the number of participants and an increase in profit can be anticipated for the long run if the number of successful bidders is large. As an example of such a bidding subject, bands of a network can be mentioned.

Figure 2:
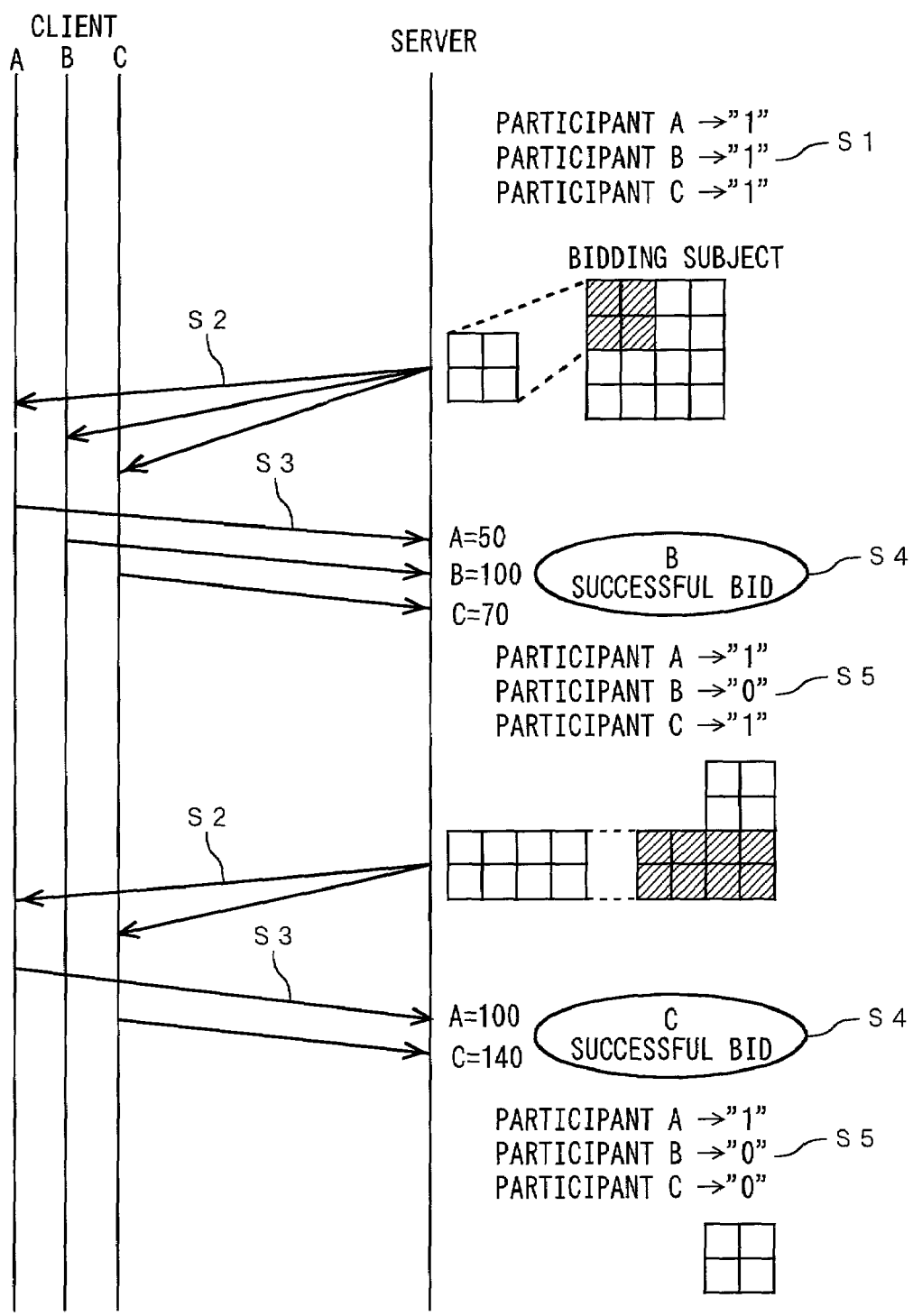
FIG. 2 is a control sequence diagram of a competitive buying and selling system of a second embodiment according to the present invention.

FIG. 2 is a control sequence diagram of a competitive buying and selling system of the present invention. First, the server sets bidding flags respectively assigned to participants A, B and C (S1). The server opens a part of a bidding subject to clients of the participants A, B and C (S2). The clients makes the participants A, B and C determine a part of the bidding subject and its bidding price, and notifies them to the server. It is now assumed that the participant A determines a bidding price of 50, the participant B determines a bidding price of 100, and the participant C determines a bidding price of 70 at this time.

The server designates the participant B who has offered the highest or lowest bidding price among the participants (A, B and C) each being set the bidding flag, as a successful bidder (S4). The server resets the bidding flag of the participant B who has made a successful bid (S5). Thereafter, this sequence is repeated.

Subsequently, the server opens a part of the bidding subject to clients of the participants A and C (S2). The clients makes the participants A and C determine a part of the bidding subject and its bidding price, and notifies them to the server. It is now assumed that the participant A determines a bidding price of 100, and the participant C determines a bidding price of 140 at this time. The server designates the participant C who has offered the highest or lowest bidding price among the participants (A and C) each being set the bidding flag, as a successful bidder (S4). The server resets the bidding flag of the participant C who has made a successful bid (S5).

In the foregoing description, the stages of S2 and S3 contain only one exchange. Alternatively, the "competitive bidding" system may also be introduced. In that case, each participant is allowed to refer to bidding prices of other participants and successively alter the own bidding price, during this time. In this case, it becomes possible to refer to bidding prices of other participants.

An embodiment of the above described competitive buying and selling system will now be described. It is now assumed that the subject of buying and selling is bands of a network, and the orderer is a communication industrial company having the network. It is further assumed that the participants aim at purchasing the network and utilizing the network for service provision. If all bands of the network of the bidding subject are knocked down to one participant, then it becomes possible for only that participant to provide service and the participant obtains the profit exclusively. In order to avoid such exclusive possession, the communication industrial company can open the bidding subject partially to the participants and exclude participants who has made a successful bid once, according to the present invention.

According to the competitive buying and selling system of the second embodiment, its control method, and recording media having its control programs recorded thereon, it becomes possible to avoid exclusive possession of the bidding subject. As a result, it becomes hard to bid an unnaturally high price. Accordingly, the bidding price is stabilized and it becomes possible to prepare such an environment that participants can easily bid.

In the above described various embodiments of the present invention, those skilled in the art can easily conduct various changes, modifications, and omissions falling in the range of the technical spirit and scope of the present invention. The foregoing description is nothing but an example, and it does not impose any restrictions. The present invention is restricted by only claims and their equivalents.

What is claimed is:

1. A control method of competitive buying and selling, said control method comprising:

a first step in which a server opens a subject of buying and selling and a successful bid evaluation function thereof for calculating an evaluation value based on actual results of past bidding to a plurality of clients;

a second step in which each of said clients makes a participant determine said subject of buying and selling and a bidding price thereof by using said successful bid evaluation function, and notifies a determined result to said server; and a third step in which said server selects a bidding price of a participant who has a highest evaluation value based on said successful bid evaluation function of all bid prices received from the clients and said server designates the participant with the highest evaluation value as a successful bidder, wherein said successful bid evaluation function is based on the equation:

$$\frac{\sum_{n=0}^{N} \frac{B_n}{W_n}(1+R_n)}{M}$$

2. A control method of competitive buying and selling, said control method comprising:

a first step in which a server opens a subject of buying and selling and a successful bid evaluation function thereof for calculating an evaluation value based on actual results of past bidding to a plurality of clients;

a second step in which each of said clients makes a participant determine said subject of buying and selling and a bidding price thereof by using said successful bid evaluation function, and notifies a determined result to said server, and a third step in which said server selects a bidding price of a participant who has a highest evaluation value based on said successful bid evaluation function of all bid prices received from the clients and said server designates the participant with the highest evaluation value as a successful bidder, wherein said successful bid evaluation function is based on the equation:

$$\frac{\sum_{n=0}^{N} \frac{B_n}{W_n}(1+R_n)}{M}$$

3. A control method of competitive buying and selling according to claim 2, wherein said successful bid evaluation function is based further on a resource occupation rate in bidding of this time.

4. A control method of competitive buying and selling according to claim 2, wherein said successful bid evaluation function is a function of multiplying said past bidding prices per unit volume by said efficiency of utilization of resources won in the past.

5. A control method of competitive buying and selling according to claim 4, wherein said successful bid evaluation function is a function of dividing a product value obtained by said multiplying by said resource occupation factor in bidding of this time.

6. A control method of competitive buying and selling according to claim 1, wherein said control method can be applied to a simultaneous bidding method and a competitive bidding method.

7. A competitive buying and selling system comprising a server and client, said server comprising:
first means for opening a subject of buying and selling and a successful bid evaluation function thereof to a plurality of clients; and
third means for selecting a bidding price of a participant who has a highest evaluation value based on said successful bid evaluation function of all bid prices received from the clients and said server designates the participant with the highest evaluation value as a successful bidder, each of said clients comprising:
second means for making a participant determine said subject of buying and selling and a bidding price thereof by using said successful bid evaluation function, and notifies a determined result to said server,
wherein said successful bid evaluation function is based on the equation:

$$\frac{\sum_{n=0}^{N} \frac{B_n}{W_n}(1+R_n)}{M}$$

8. Computer-readable medium having program instructions for competitive buying and selling system having a server side program and client side programs recorded thereon, said server side program comprising:
a first control program for opening a subject of buying and selling and a successful bid evaluation function thereof to a plurality of clients; and
a third control program for selecting a bidding price of a participant who has a highest evaluation value based on said successful bid evaluation function of all bid prices received from the clients and designating the participant with the highest evaluation value as a successful bidder, each of said client side programs comprising:
a second control program for making a participant determine said subject of buying and selling and a bidding price thereof by using said successful bid evaluation function, and notifying a determined result to said server,
wherein said successful bid evaluation function is based on the equation:

$$\frac{\sum_{n=0}^{N} \frac{B_n}{W_n}(1+R_n)}{M}$$

* * * * *